United States Patent [19]
Patil et al.

[11] Patent Number: 5,514,291
[45] Date of Patent: May 7, 1996

[54] HYDROXY AROMATIC COMPOUND MANNICH BASE DERIVATIVES OF AMINO-SUBSTITUTED POLYMERS FOR OLEAGINOUS COMPOSITIONS

[75] Inventors: Abhimanyu O. Patil, Westfield, N.J.; Robert D. Lundberg, Williamsburg, Va.; Sudhin Datta, Matawan, N.J.

[73] Assignee: Exxon Chemical Patents Inc., Linden, N.J.

[21] Appl. No.: 178,199

[22] Filed: Jan. 6, 1994

[51] Int. Cl.$^6$ .................................................. C10M 149/16
[52] U.S. Cl. ........................................................ 252/51.5 R
[58] Field of Search ........................................ 252/51.5 R

[56] References Cited

U.S. PATENT DOCUMENTS

| | | | |
|---|---|---|---|
| 4,101,434 | 7/1978 | Edwards et al. | 252/52 R |
| 4,248,725 | 2/1981 | Crawford et al. | 252/51.5 A |
| 4,501,595 | 2/1985 | Sung et al. | 44/57 |
| 4,668,412 | 5/1987 | Hart et al. | 252/51.5 A |
| 4,780,230 | 10/1988 | Liu et al. | 252/51.5 R |
| 4,797,219 | 1/1989 | Guttierrez et al. | 252/56 D |
| 4,798,678 | 1/1989 | Liu et al. | 252/50 |
| 4,808,325 | 2/1989 | Song et al. | 252/51.5 R |
| 4,812,261 | 3/1989 | Liu et al. | 252/51.5 A |
| 4,877,834 | 10/1989 | Liu et al. | 525/66 |
| 4,904,404 | 2/1990 | Liu et al. | 252/51.5 A |
| 4,919,684 | 4/1990 | Nalesnik et al. | 44/62 |
| 5,030,370 | 7/1991 | Patil et al. | 252/50 |
| 5,288,418 | 2/1994 | Farng et al. | 252/49.9 |
| 5,292,444 | 3/1994 | Patil et al. | 252/50 |
| 5,292,813 | 3/1994 | Patil et al. | 252/50 |
| 5,345,002 | 9/1994 | Song et al. | 252/51.5 R |

*Primary Examiner*—Ellen M. McAvoy
*Attorney, Agent, or Firm*—T. V. Kowalchyn

[57] ABSTRACT

The novel polymers of the present invention are prepared by reacting a hydroxy aromatic compound containing at least one —OH group in the ring, an aldehyde and amino-substituted polymer (e.g., an ethylene alpha-olefin interpolymer substituted by primary amino or secondary amino groups) to form an oil soluble Mannich base derivative useful as antioxidant dispersant viscosity modifier additive in oleaginous compositions such as lubricating oils and fuels. Preferred aromatic compounds are phenols such as 2,6-di-t-butylphenol or 2,6-dimethylphenol. Preferred amino-substituted interpolymers comprise amino-substituted ethylene propylene norbornene terpolymers.

8 Claims, No Drawings

HYDROXY AROMATIC COMPOUND MANNICH BASE DERIVATIVES OF AMINO-SUBSTITUTED POLYMERS FOR OLEAGINOUS COMPOSITIONS

BACKGROUND OF THE INVENTION

1. Field of the Invention

The present invention relates to oil-soluble Mannich base materials useful as multifunctional viscosity index improver (viscosity modifier), dispersant, and antioxidant additives for oleaginous compositions derived from amino-substituted polyolefin polymers and hydroxy aromatic compounds.

2. Discussion of Prior Art

U.S. Pat. No. 4,780,230 relates to a lubricating oil composition comprising a major portion of lubricating oil and a minor amount of a reaction mixture of a carbon-carbon polymer containing an epoxide moiety grafted under 200 psig pressure and a Mannich base formed by reacting an aldehyde, a primary or secondary amine, and a hindered phenol.

U.S. Pat. No. 4,798,678 relates to a mixture of oil, an ethylene-propylene copolymer, a piperazine and a hindered phenol.

U.S. Pat. No. 4,812,261 relates to a carbon-carbon backbone polymer containing a grafted epoxide moiety which is functionalized with (a) a Mannich base formed by the reaction of an aldehyde, polyamine and a non-hindered phenol and (b) a polyamine containing at least one active hydrogen atom bonded to a nitrogen atom.

U.S. Pat. No. 4,877,834 relates to a reaction mixture of carbon-carbon polymer containing an epoxide moiety with phenol-amine-aldehyde Mannich condensate wherein said condensate is joined through a nitrogen atom to an open epoxide moiety of the polymer.

U.S. Pat. No. 4,904,404 relates to a carbon-carbon backbone polymer containing a grafted epoxide moiety which is functionalized with (a) a Mannich base formed by the reaction of an aldehyde, polyamine and a non-hindered phenol and (b) N-vinyl pyrrolidone.

U.S. Pat. No. 5,030,370 discloses lubricating oil compositions comprising lubricating oil and a ethylene alpha-olefin interpolymer substituted by primary amino or secondary amino groups. The preferred amino-substituted interpolymers comprise amino-substituted ethylene propylene norbornene terpolymers. The polymers are useful as viscosity index improver dispersants.

SUMMARY OF THE INVENTION

One aspect of the present invention provides novel polymers prepared by reacting (A) at least one amino-substituted polymer (e.g., an ethylene alpha-olefin interpolymer) substituted by primary amino or secondary amino groups, (B) at least one hydroxy aromatic compound containing at least one —OH group in the ring and (C) at least one aldehyde to form an oil soluble Mannich base derivative useful as multifunctional viscosity index improver (viscosity modifier), dispersant, and antioxidant additive in oleaginous compositions such as lubricating oils and fuels. Preferred hydroxy aromatic compound are phenols such as 2,6-di-t-butylphenol or 2,6-dimethylphenol. Preferred amino-substituted interpolymers comprise amino-substituted ethylene propylene norbornene terpolymers. Such amino-substituted interpolymers can be prepared by co-polymerizing ethylene (and, optionally, an alpha-olefin) with a masked nitrogen-containing monomer wherein the primary or secondary nitrogen group of the nitrogen-containing monomer is masked with an organometallic compound (preferably, a non-halogenated organometallic compounds), followed by deashing the resulting interpolymer to remove the organometallic compound and thereby form the amino-substituted interpolymer.

One object of the present invention is the production of aromatic Mannich Base-grafted olefin polymers including polymer chain monomers and nitrogen-containing monomers having a substantially uniform level of functionality among the polymer chains.

A still further object of the present invention is the production of aromatic Mannich Base-grafted olefin polymers including polymer chain monomers and nitrogen-containing monomers which are essentially devoid of organic halides.

Another object of the present invention is to provide a method for forming an aromatic Mannich Base-grafted polymer chain of polymer chain monomers and nitrogen-containing monomers comprising reacting a nitrogen-containing monomer with a non-halogenated metallic compound to formed masked, nitrogen-containing monomers, polymerizing polymer chain monomers with the masked group containing monomers to produce the polymer chain containing primary or secondary amine groups and reacting these amine groups with an aromatic hydroxy compound and aldehyde to form an oil soluble Mannich base derivative having viscosity index improver-dispersant, dispersant, and antioxidant properties.

Another further object of the present invention is to provide a method for forming a hydroxy aromatic Mannich Base-grafted polymer chain of olefins, referred to herein as polymer chain monomers, and nitrogen-containing monomers, which involves (a) reacting (i) nitrogen-containing monomers having a general formula of:

wherein $R^1$ is selected from the group consisting of ethylenically unsaturated hydrocarbyl radicals, n is an integer of at least 1, and X is selected from the group consisting of primary amino, secondary amino, imino and cyano groups with· (ii) non-halogenated metallic compounds to form masked, nitrogen-containing monomers; (b) polymerizing polymer chain monomers with the masked, nitrogen-containing monomers to produce the polymer chain, containing primary or secondary amine groups; and (c) reacting these amine groups with a hydroxy aromatic compound and aldehyde to form an oil soluble Mannich base derivative having viscosity index improver-dispersant, dispersant, and antioxidant properties.

The non-halogenated metallic compound used for purpose of the present invention is an organometallic compound of the formula:

wherein M is a member selected from Group IIA, IIB, IIA, IVA, and the transition metal elements and is preferably an element selected from a group consisting of aluminum, magnesium, and zinc, and wherein r is an integer from 1 to 4 and is selected so as to satisfy the valence for metal M, and Y is at least one of $R^2$, $R^3$, $R^4$ and $R^5$, wherein $R^2$–$R^5$ are (preferably independently) selected from the group consisting of hydrogen and $C_1$–$C_{16}$ hydrocarbyl, which may or may not contain unsaturation, including $C_1$–$C_{16}$ alkyl, $C_6$–$C_{16}$ aryl, $C_1$–$C_{16}$ alkoxy, provided that at least one of $R^2$–$R^5$ is not hydrogen. Exemplary of preferred $R^2$–$R^5$ groups are members selected from the group consisting of hydrogen, methyl, ethyl, diethyl, propyl, isopropyl, butyl, isobutyl, tertiary butyl, pentyl, and hexyl, and phenyl. Suitable organometallic compounds are diethylzinc, and di-n-hexylmagnesium, with triisobutylaluminum, triethylaluminum, and diisobutyl aluminum hydride being preferred.

DETAILED DESCRIPTION OF THE INVENTION

Preparation of the Amino-Substituted Interpolymer

A description for preparation of the amino-substituted interpolymer can be found in U.S. Pat. No. 5,030,370; the disclosures of which are herein incorporated by reference.

The preferred amino-substituted ethylene-propylene copolymers employed in this invention will comprise from about 20 to 90 wt. percent ethylene, from about 10–80 wt. percent propylene, and from about 0.01 to 40 wt. percent nitrogen-containing monomer, more preferably from about 0.1 to 20 wt. percent, still more preferably from about 0.75 to 10 wt. percent, and most preferably from about 1 to 7 wt. percent, nitrogen-containing monomer. The preferred amino-substituted ethylene-propylene-diene terpolymers employed in this invention will therefore comprise from about 20–90 wt. percent ethylene, from about 10– 80 wt. percent propylene, from about 0.5 to 15 wt. percent (and more preferably from about 1 to 10 wt. percent) non-conjugated diene, and from about 0.01 to 40 wt. percent, more preferably from about 0.1 to 20 wt. percent, still more preferably from about 0.75 to 10 wt. percent, and most preferably from about 1 to 7 wt. percent, nitrogen-containing monomer.

The amino-substituted polymers employed in this invention are oil soluble and have a number average molecular weight ($\overline{Mn}$) of from about 500 to 500,000. The amino-substituted polymers with $\overline{Mn}$ of from 500 to 20,000. are preferred for use in preparing the dispersant additives of this invention for use in oleaginous compositions (more preferably $\overline{Mn}$ of from 800 to 5,000). The amino-substituted polymers, when intended for use in preparing the viscosity index improver dispersants of the present invention, preferably will have $\overline{Mn}$, of from greater than 20,000 to 200,000 or more, and more preferably from 20,000 to 150,000.

Preferably, the amino-substituted polymer will have within its structure, on average, at least 0.5 (e.g., from 0.5 to 20), and preferably at least 1 (e.g., from 1 to 15) pendent reactive amine groups (i.e., primary and/or secondary amine groups) per polymer molecule.

The amino-substituted polymer will preferably also have a molecular weight distribution ($\overline{Mw}/\overline{Mn}$) of from about 1.0 to 20, and more preferably of from about 1.5 to 15.

Preferably, the amino-substituted polymers have a substantially homogeneous distribution of amino functionality between the polymer chains, that is, the wt. percent concentration of amino functionality is substantially uniform for chains of all molecular weights.

THE ALDEHYDE MATERIAL

The aldehyde reactants employed in preparing the materials of this invention will generally comprise formaldehyde or paraformaldehyde, although it will be understood that other aldehyde-group containing compounds, such as $C_2$ to $C_{10}$ hydrocarbyl aldehydes (e.g., butyraldehyde, acetaldehyde, propionaldehyde, and the like) can also be employed. A preferred group of aldehyde materials are compounds of the formula: R"CHO, wherein R" is H, aliphatic hydrocarbon radical (e.g., having from 1 to 4 carbon atoms), or aromatic radical (e.g., having from 6 to 10 carbon atoms).

THE HYDROXY AROMATIC REACTANTS

The aromatic reactants useful in the present invention comprises hydroxy aromatic compounds. A hydroxy aromatic compound is an aromatic compound including an aryl ring: naphthalene, anthracene or preferably a benzene ring bearing at least one hydroxy (—OH) group. It also includes at least one and preferably two hindering R groups adjacent to the phenol hydroxy group. Typically hindering groups include bulky groups typified by t-butyl or t-amyl. Presence of such groups contributes anti-oxidant ability to the resultant product.

It is a feature of these aromatics that they contain an active hydrogen which will be the site for reaction and that they contain hindering or blocking groups (at least one and typically two) in positions adjacent to the —OH group. At least one position which may be meta-, but which is preferably ortho- or para- to the aromatic hydroxy group, must be occupied by an active hydrogen as this is the point of reaction with the aldehyde group.

Preferably, the hindering groups are lower ($C_1$–$C_{10}$) alkyl groups which occupy a substantial volume of space. Typically hindering groups may be isopropyl, isobutyl, t-butyl, isoamyl, t-amyl. Hindered phenols which are most readily available commercially include t-butyl groups.

These hindering R groups may be alkyl, alkaryl, aralkyl, cycloalkyl, aryl groups. In the above compound, R may be typically be a hydrocarbon group selected from the group consisting of alkyl, aralkyl, cycloalkyl, aryl and alkaryl including such radicals when inertly substituted. When R is alkyl, it may be typically be methyl, ethyl, n-propyl, isopropyl, n-butyl, i-butyl, sec-butyl, amyl, octyl, decyl, octadecyl. When R is aralkyl, it may typically be benzyl, betaphenylethyl. When R is cycloalkyl, it may typically be cyclohexyl, cycloheptyl, cyclooctyl, 2-methylcycloheptyl, 3-butylcyclohexyl, 3-methylcyclohexyl. When R is aryl, it may typically be phenyl, naphthyl. When R is alkaryl, it may typically be tolyl, xylyl. The preferred R groups may be lower alkyl, i.e., $C_1$–$C_{10}$ alkyl, groups including e.g., methyl, ethyl, n-propyl, i-propyl, butyls, amyls, hexyls, octyls, decyls.

Commonly R is a branched chain alkyl group containing about 1–10 carbon atoms. R may, for example, be isopropyl, t-butyl, sec-butyl, isobutyl, sec-amyl, t-amyl, isoamyl, and corresponding branched hexyl, heptyl, octyl, decyl, etc. Both R groups are commonly the same. Preferred R groups may be branched chain alkyl groups containing 1–10, say 3–5 carbon atoms. Most preferred is t-butyl. Preferred herein are hydroxy aromatic compounds of the formula:

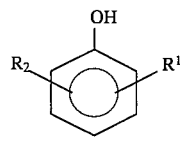

wherein $R^1$ and $R^2$ are independently selected from the group consisting of —OH, or $C_1$ to $C_{24}$ hydrocarbyl.

Exemplary of the hydroxy aromatic reactants useful in this invention are: 2,6-di-t-butylphenol, 2,6-di-t-amylphenol, 2,6-diisobutylphenol, 2,6-dimethylphenol.

The most preferred hydroxy aromatic compound is 2,6-di-t-butylphenol.

PREPARATION OF THE MANNICH BASE DERIVATIVES

The amino-substituted polymer is reacted with the aldehyde and hydroxy aromatic reactant in accordance with this invention by contacting in a reaction zone. The reactants are contacted for a time and under conditions effective to react the aldehyde, reactive amine groups of the amino-substituted polymer and the —OH groups of the substituted aromatic reactant to form a Mannich Base condensation product containing hydroxy aromatic units bound to at least a portion of the amino-substituted polymer through a hydrocarbylene group derived from the aldehyde (e.g., a methylene (—$CH_2$—) group derived from formaldehyde).

The conditions of temperature and pressure under which the reaction occurs can vary widely, and generally temperatures of from about 0° to 200° C., preferably from about 25° to 140° C. Temperatures of less than 0° C. can be used but undesirably slow reaction rates can result. Reaction temperatures of greater than 200° C., up to the decomposition point of the reactants or reaction products, can also be employed, with the attendant formation of by-products. The pressures in the reaction zone will be sufficient to maintain a liquid reaction medium, and generally pressures from about 0.1 to 1000 kPa, and preferably from about 1 to 100 kPa, will be employed.

The reaction can be carried out in a batchwise, continuous or semicontinuous manner, in one or more reaction zones. The reaction can be conducted in any conventional apparatus such as stirred tank reactors, tubular flow reactors and the like.

The reactants can be charged to the reaction zone continuously or intermittently, together or sequentially, in any order. Generally, the amino-substituted polymer and any solvent for the reaction will be first charged to the reaction zone, followed by aldehyde reactant and then by addition of the hydroxy aromatics reactant, which can, if desired, be introduced to the reaction zone as a mixture of the aldehyde and hydroxy aromatics reactants. Preferably, first the amino-substituted polymer is contacted with the hydroxy aromatic reactant and then combined with the aldehyde reactant at reaction conditions.

The process of the present invention can be accomplished using a wide range of ratios of reactants, and the amino-substituted polymer:aldehyde reactant:hydroxy aromatic reactant will generally be charged in a ratio of from 1:0.1:0.1 to 1:50:50, preferably from 1:0.2:0.2 to 1:10:10, and more preferably from 1:0.5:0.5 to 1:5:5, molar equivalents of amino-substituted polymer:moles of aldehyde reactant:moles of hydroxy aromatic reactant.

The reaction can be conducted in the absence, or in the presence, of a diluent or solvent for the amino-substituted polymer. Suitable solvents include mineral and synthetic lubricating oils, and hydrocarbon solvents such as aliphatics, cycloaliphatics, and aromatic hydrocarbon solvents, or halogenated versions of such solvents. The preferred solvents are $C_{12}$ or lower straight-chain or branched-chain, saturated hydrocarbons, and $C_5$ to $C_9$ saturated alicyclic or aromatic hydrocarbons, or $C_2$ to $C_6$ halogenated hydrocarbons. Non-limiting illustrative examples of diluents or solvents are butane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane.

The reaction time can vary widely, and will depend on such factors as the amount of reactants employed, the size of the reaction vessel, the temperature and other factors. Generally, the reaction time will range from about 0.5 to 48 hours, and more typically from 2 to 12 hours.

The hydroxy aromatic reactants are attached to one or more of the nitrogen atoms of the amino-substituted polymer through the residue of the aldehyde employed, e.g., —$CH_2$— in the case of formaldehyde. For the amino-substituted interpolymers employed in this invention, this can be illustrated as follows:

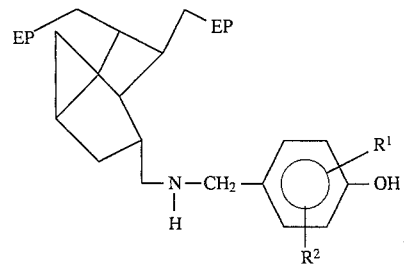

wherein EP represents the balance of the polymer, and wherein $R^1$ and $R^2$ are independently selected from the group consisting of —OH, or $C_1$ to $C_{24}$ hydrocarbyl. Similarly, the use of amino-substituted polymers, prepared by amination of halogenated polymers, can be illustrated as follows:

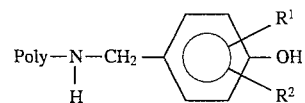

wherein "Poly" represents the balance of the polymer and $R^1$ and $R^2$ are as defined above.

Generally, from 50 to 100 wt. percent (and preferably from 80 to 100 wt. percent) of the N atoms in the amino-substituted polymer will be primary and/or secondary, and therefore reactive with the aldehyde and hydroxy aromatic reactants, and preferably at least about 10 wt. percent of the reactive N atoms (e. g., from 10 to about 100 wt. percent), and more preferably at least about 50 wt. percent (e.g., from 50 to about 100 wt. percent) of the reactive N atoms in the amino-substituted polymer will be reacted with the aldehyde and hydroxy aromatic reactant to form >N-ald-phenol groups (wherein "aid" is the linking unit derived from the aldehyde reactant and hydroxy aromatic reactant).

The Mannich base derivatives of the amino-substituted polymers prepared by the process of this invention are soluble in common organic solvents and in mineral oils. The novel polymers of this invention are useful in oleaginous compositions as dispersant-viscosity index improver additives or as dispersant additives, and possess antioxidant properties. The polymers of this invention are characterized by improved thermooxidative and thermal stability properties compared to the amino-substituted polymers from which they are prepared. The polymers of this invention also find utility in other applications such as thermoplastic systems, and are capable of being cast into coherent films, additives for conventional thermoplastics, and the like. As pointed out above, the products of this invention prepared from amino-substituted polymers having (a) a $\overline{M}n$ of from 500 to 20,000 (preferably from 800 to 5,000) are useful as dispersant additives in oleaginous compositions and (b) a $\overline{M}n$ of from greater than 20,000 to 200,000 or more (preferably from 20,000 to 150,000) are useful as viscosity index improver dispersants in oleaginous compositions.

OLEAGINOUS COMPOSITIONS

The additives of the present invention possess very good dispersant and antioxidant properties as measured herein in a wide variety of environments. Accordingly, the additives are used by incorporation and dissolution into an oleaginous material such as fuels and lubricating oils.

The additives of the present invention can be incorporated into a lubricating oil (or a fuel) in any convenient way. Thus, these mixtures can be added directly to the lubricating oil (or fuel) by dispersing or dissolving the same in the lubricating oil (or fuel) at the desired level of concentration of the dispersant. Such blending into the additional lubricating oil (or fuel) can occur at room temperature or elevated temperatures.

The additives of the present invention find their primary utility in lubricating oil compositions which employ a base oil in which the additives are dissolved or dispersed. Such base oils may be natural or synthetic.

Lubricating oil formulations conventionally contain several different types of additives that will supply the characteristics that are required in the formulations. Among these types of additives are included viscosity index improvers, antioxidants, corrosion inhibitors, detergents, dispersants, pour point depressants, antiwear agents, friction modifiers, etc., as described in U.S. Pat. No. 4,797,219, the disclosure of which is hereby incorporated by reference in its entirety. Some of these numerous additives can provide a multiplicity of effects, e.g., a dispersant-oxidation inhibitor. This approach is well known and need not be further elaborated herein.

Compositions when containing these conventional additives are typically blended into the base oil in amounts effective to provide their normal attendant function. Representative effective amounts of such additives (as the respective active ingredients) in the fully formulated oil are illustrated as follows:

| Compositions | Wt. % A.I. (Preferred) | Wt. % A.I. (Broad) |
|---|---|---|
| Viscosity Modifier | 0.01–4 | 0.01–12 |
| Detergents | 0.01–3 | 0.01–20 |
| Corrosion Inhibitor | 0.01–1.5 | .01–5 |
| Oxidation Inhibitor | 0.01–1.5 | .01–5 |
| Dispersant | 0.1–8 | .1–20 |
| Pour Point Depressant | 0.01–1.5 | .01–5 |
| Anti-Foaming Agents | 0.001–0.15 | .001–3 |
| Anti-Wear Agents | 0.001–1.5 | .001–5 |
| Friction Modifiers | 0.01–1.5 | .01–5 |
| Mineral Oil Base | Balance | Balance |

In the preparation of lubricating oil formulations it is common practice to introduce the additives in the form of 10 to 80 wt. percent, e.g., 20 to 80 wt. percent active ingredient concentrates in hydrocarbon oil, e.g., mineral lubricating oil, or other suitable solvent. Usually these concentrates may be diluted with 3 to 100, e.g., 5 to 40 parts by weight of lubricating oil, per part by weight of the additive package, in forming finished lubricants, e.g., crankcase motor oils. The purpose of concentrates, of course, is to make the handling of the various materials less difficult and awkward as well as to facilitate solution or dispersion in the final blend. Thus, a dispersant would be usually employed in the form of a 40 to 50 wt. percent concentrate, for example, in a lubricating oil fraction.

The additives of the present invention will be generally used in admixture with a lube oil basestock, comprising an oil of lubricating viscosity, including natural and synthetic lubricating oils and mixtures thereof.

When other additives are employed, it may be desirable, although not necessary, to prepare additive concentrates comprising concentrated solutions or dispersions of the novel additive of this invention (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the additives in proper amounts to provide the desired concentration in the final formulation when the additive-package is combined with a predetermined amount of base lubricant. Thus, the additive of the present invention can be added to small amounts of base oil or other compatible solvents along with other desirable additives to form additive-packages containing active ingredients in collective amounts of typically from about 2.5 to about 90 percent, and preferably from about 15 to about 75 percent, and most preferably from about 25 to about 60 percent by weight additives in the appropriate proportions with the remainder being base oil.

The multi-functional viscosity index improvers of the instant invention may be utilized in a concentrate form, e.g., from about 5 wt. percent up to about 50 wt. percent, preferably 7 to 25 wt. percent, in oil, e.g., mineral lubricating oil, for ease of handling, and may be prepared in this form by carrying out the reaction of the invention in oil as previously discussed.

EXAMPLE 1

13.2 mi. of 5-norbornene-2-methylamine (NBMA) (12.8 gm.) was added to 200 ml of hexane. To this solution was added 81 ml. of a 20 wt. percent solution of diisobutyl aluminum hydride (DIBAL-H) in hexane at 20° C. under a nitrogen blanket over a period of 90 seconds. The resultant solution containing the MNCM (masked nitrogen containing monomer) was introduced into the polymerization reactor to prepare an amino-substituted EP (ethylene propylene) interpolymer. The conditions of polymerization are shown in Table I and the results in Table II:

TABLE I

| Conditions | |
|---|---|
| Reactor | = 3.875 liter (CFSTR) |
| Temperature | = 30° C. |
| Pressure | = 500 kPa gauge |
| Agitation | = 1200 rpm |
| Residence Time | = 9 min. |
| Al/V Molar Ratio | = 10 for catalyst compounds |
| Feeds | |
| Hexane | = 4.22 kg/hr. |
| Ethylene | = 67.5 g/hr. |
| Propylene | = 162.1 g/hr. |
| $VCl_4$ | = 0.646 g/hr. |
| EADC | = 4.25 g/hr. |
| Hydrogen | = 120 w ppm on ethylene |

TABLE I-continued

| | |
|---|---|
| NCM (nitrogen containing monomer masked as above) | = 1.917 g/hr. |

TABLE II

| Polymerization Parameters | | Polymer Proportion | | |
|---|---|---|---|---|
| Rate (g/hr) | Catalyst Efficiency (g/g) | Ethylene Content (wt %) | $M_L(1+4)$ (125° C.) | MNCM (Conv %) |
| 173 | 267 | 36.8 | 6.7 | 92 |

The resulting amine grafted ethylene propylene polymer was isolated as follows. 500 ml. of 1:1 water and i-PA at 65° C. for 1 hour. At the end of the period, the water layer was removed and the supernatant hexane layer was washed with 500 ml. of water. The pH of the hexane layer was adjusted to 7 and the polymer recoverred by evaporation of solvent.

EXAMPLE 2

10 ml. of 10% heptane solution of 2,6-di-t-butylphenol were added in a 200 ml. 3.7% hexane solution of the ethylene propylene diene monomer-amine (EPDM-NH$_2$) product of Example 1 and then 0.5 ml. of 37% formaline was added. The solution was reflux for 12 hours. The product was isolated by precipitating the solid with acetone. The final product was washed twice with acetone and then dried under vacuum. The Mannich base polymer product was found to be soluble in tetrahydrofuran, heptane, xylene and mineral lubricating oil.

IR spectra of 2,6-di-t-butylphenol reacted EPDM-NH$_2$ showed characteristic absorption peaks due to non-hydrogen bonded 2,6-di-t-butylphenol at 3620 cm$^{-1}$ along with peaks due to parent polymer. The grafted polymer was soluble in THF, xylene and oil.

The above 2,6-di-t-butylphenol-EPDM-NH$_2$ polymer Mannich Base product was analyzed by thermal gravimetric analysis (TGA) under air (Perkin Elmer II model) to determine the polymer's thermooxidative stability. A TGA analysis of the amino-substituted interpolymer of Example 1 was also made as a comparison. The resultant data indicate that the 2,6-di-t-butylphenol bound EPDM (Example 2) is more stable than its amino-substituted polymer precursor (Example 1) by about 46° C. at a weight loss of 50 wt. percent.

The 2,6-di-t-butylphenol EPDM Mannich base polymer product of Example 2 was then tested for sludge inhibition (via the SIB test) and varnish inhibition (via the VIB test), as described below as was Example 1.

The SIB test has been found, after a large number of evaluations, to be an excellent test for assessing the dispersing power of lubricating oil dispersant additives.

The medium chosen for the SIB test was a used crankcase mineral lubricating oil composition having an original viscosity of about 325 SUS at 38° C. that had been used in a taxicab that was driven generally for shod trips only, thereby causing a buildup of a high concentration of sludge precursors. The oil that was used contained only a refined base mineral lubricating oil, a viscosity index improver, a pour point depressant and zinc dialkyldithiophosphate anti-wear additive. The oil contained no sludge dispersant. A quantity of such used oil was acquired by draining and refilling the taxicab crankcase at 1000–2000 mile intervals.

The SIB test was conducted in the following manner: the aforesaid used crankcase oil, which was milky brown in color, was freed of sludge by centrifuging for one hour at about 39,000 gravities (gs.). The resulting clear bright red supernatant oil was then decanted from the insoluble sludge particles thereby separate out. However, the supernatant oil still contained oil-soluble sludge precursors which on heating under the conditions employed by this test will tend to form additional oil-insoluble deposits of sludge. The sludge inhibiting properties of the additives being tested were determined by adding to portions of the supernatant used oil, a small amount of the particular additive being tested. Ten grams of each blend being tested were placed in a stainless steel centrifuge tube and were heated at 135° C. for 16 hours in the presence of air. Following the heating, the tube containing the oil being tested was cooled and then centrifuged for about 30 minutes at room temperature at about 39,000 gs. Any deposits of new sludge that form in this step were separated from the oil by decanting the supernatant oil and then carefully washing the sludge deposits with 25 ml of heptane to remove all remaining oil from the sludge and further centrifuging. The weight of the new solid sludge that forms in the test, in milligrams, was determined by drying the residue and weighing it. The results were reported as amount of precipitated sludge in comparison with the precipitated sludge of a blank not containing any additional additive, which blank was normalized to a rating of 10. The less new sludge precipitated in the presence of the additive, the lower the SIB value and the more effective was the additive as a sludge dispersant. In other words, if the additive gave half as much precipitated sludge as the blank, then it would be rated 5.0 since the blank will be normalized to 10.

The VIB test was used to determine varnish inhibition. Here, each test sample consists of 10 grams of lubricating oil containing a small amount of the additive being tested. The test oil to which the additive was o admixed was of the same type as used in the above-described SIB test. Each ten gram sample was heat soaked overnight at about 140° C. and thereafter centrifuged to remove the sludge. The supernatant fluid of each sample was subjected to heat cycling from about 150° C. to room temperature over a period of 3.5 hours at a frequency of about 2 cycles per minute. During the heating phase, gas which was a mixture of about 0.7 volume percent SO$_2$, 1.4 volume percent NO and balance air was bubbled through the test samples. During the cooling phase, water vapor was bubbled through the test samples. At the end of the test period, which testing cycle can be repeated as necessary to determine the inhibiting effect of any additive, the wall surfaces of the test flasks in which the samples are contained are visually evaluated as to the varnish inhibition. The amount of varnish imposed on the walls was rated to values of from 1 to 11 with the higher number being the greater amount of varnish, in comparison with a blank with no additive that is rated 11.

10.00 grams of SIB test oil are mixed with the indicated amount of the products of Example I and Example 2 and tested in the aforedescribed SIB and VIB tests. The data thereby obtained are summarized in Table III below.

TABLE III

| Reaction Product of | Charge Amount | SIB*, mg | VIB* rating |
|---|---|---|---|
| Example 2 EPDM-NH$_2$, CH$_2$O | 0.08 g | 4.88 | 4 |

TABLE III-continued

| Reaction Product of | Charge Amount | SIB*, mg | VIB* rating |
|---|---|---|---|
| with phenol and Example 2 EPDM-NH$_2$, CH$_2$O phenol and | 0.16 g | 3.25 | 3 |
| Example 1 EPDM-NH$_2$ | 0.08 g | 6.03 | 9 |
| Taxi Cab 170 | | 10.00 | 11 |

*Without the additive, SIB will be 10 and VIB will be 11. The lower the number, the better the performance.

The above data illustrate the sludge and varnish inhibiting properties of the products of this invention.

EXAMPLE 3-5

15 grams of EPDM-NH$_2$ from Example 1 was dissolved into 300 ml THF. The THF solution was divided into 3 equal parts i.e., in every 100 ml THF, there is a 5 g of polymer. Into the solutions were added 2,6-di-t-butylphenol and formaline in an amounts shown below. Solution stirred for 24 hours and polymer product was precipitated with acetone. Samples were dried under vacuum.

| Example | EPDM-NH$_2$ | Formaline | 2,6-di-t-butyl-phenol | Mole Ratio of Reactants |
|---|---|---|---|---|
| 3. | 5 g | 0.029 ml | 0.730 g | 1:1:10 |
| 4. | 5 g | 0.290 ml | 0.073 g | 1:10:1 |
| 5. | 5 g | 0.014 ml | 0.073 g | 1:0.5:1 |

The samples were evaluated for solubility in xylene and in oil S100N. 0.5 g of product was dissolved in 9.5 g of xylene and in 9.5 g of oil S 100N. The solutions were kept at room temperature. The product C became completely soluble in both the solvent within 24 hours, while two other products, although swelled, were not soluble. Subsequently, the solution then were kept at 80° C. oven for 24 more hours. After 24 hours, these two samples were also soluble in xylene as well as oil. These results show that at a wide range of ratios of formaline and phenol to EPDM-NH$_2$, a useful antioxidant dispersant viscosity modifier can be obtained.

What is claimed is:

1. An oil soluble nitrogen-containing antioxidant dispersant viscosity modifier additive which comprises a Mannich Base adduct of at least one oil soluble amino-substituted polymer, at least one aldehyde reactant and at least one hydroxy aromatic reactant containing at least one —OH group in the aromatic ring, wherein said amino-substituted polymer comprises an amino-substituted interpolymer and is formed by a process which comprises:

(a) reacting at a temperature of less than 60° C. (i) at least one monomer having a general formula of:

$R^1(X)_n$ wherein $R^1$ comprises an ethylenically unsaturated hydrocarbyl radical, n is an integer of at least 1, and X is selected from the group consisting of imino, primary amino, secondary amino, and cyano groups, with (ii) a masking agent comprising at least one metallic compound to form the corresponding masked nitrogen-containing monomers; and (b) polymerizing polymer chain monomers with said masked, nitrogen-containing monomer to produce a polymerization product comprising a polymer chain including masked, nitrogen-containing monomer wherein said polymer chain monomers comprise members selected from the group consisting of ethylene and $C_3$ to $C_{25}$ alpha-olefins; and (c) deashing said polymerization product and recovering said amino-substituted interpolymer.

2. The oil soluble additive of claim 1, wherein said masking agent comprises a non-halogenated metallic compound and said amino-substituted interpolymer comprises less than 0.10% by weight of halogen.

3. The oil soluble additive of claim 1, wherein $R^1$ is selected from the group consisting of radicals from alpha-olefins, norbornene and homologues of norbornene having the general formula of:

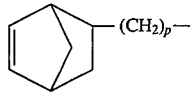

wherein p is an integer of at least one.

4. The oil soluble additive of claim 2, wherein said non-halogenated metallic compound is an organometallic compound of the formula:

$M(Y)_r$ wherein M is a member selected from Group IB, IIA, IIB, IIIA, IVA, and the transition metal elements, Y is at least one of $R^2$, $R^3$, $R^4$ and $R^5$, wherein $R^2$–$R^5$ are independently selected from the group consisting of hydrogen, and non-halogenated $C_1$–$C_{16}$ hydrocarbyl radicals, and non-halogenated $C_1$–$C_{16}$ hydrocarbyloxy radicals and r is an integer of from 1 to 4.

5. The oil soluble additive of any of claims 1 to 4, wherein said hydroxy aromatic reactant comprises at least one aromatic compound of the formula:

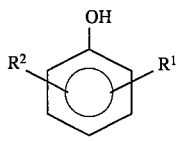

wherein $R^1$ and $R^2$ are independently selected from the group consisting of —OH, or $C_1$ to $C_{24}$ hydrocarbyl.

6. The oil soluble additive of claim 5, wherein said aldehyde is formaldehyde or paraformaldehyde.

7. The oil soluble hydroxy aromatic additive of claim 6, wherein said reactant comprises 2,6-di-t-butylphenol or 2,6-dimethylphenol.

8. A lubricating oil composition comprising lubricating oil and from about 0.1 to 20 wt. percent of the oil soluble additive of claim 1.

* * * * *